United States Patent [19]

Huster et al.

[11] 4,416,701
[45] Nov. 22, 1983

[54] METHOD OF PRODUCING STARCH FROM GRAIN OR GROUND GRAIN PRODUCTS BY THE WET PROCESS

[75] Inventors: Heinrich Huster, Oelde; Friedrich Meuser, Berlin; Carl-Heinz Hoepke, Bad Salzuflen, all of Fed. Rep. of Germany

[73] Assignee: Westfalia Separator AG, Oelde, Fed. Rep. of Germany

[21] Appl. No.: 355,087

[22] Filed: Mar. 5, 1982

[30] Foreign Application Priority Data

Mar. 18, 1981 [DE] Fed. Rep. of Germany ....... 3110464

[51] Int. Cl.³ .......................... C13L 1/00; C13L 1/02
[52] U.S. Cl. ....................................... 127/68; 127/24; 127/69; 426/481; 426/507
[58] Field of Search .............................. 241/11, 12, 13; 426/482, 507, 481; 127/68, 24, 25, 69, 39

[56] References Cited

U.S. PATENT DOCUMENTS

| 2,543,660 | 2/1951 | Eckers | 127/69 |
| 3,637,399 | 1/1972 | Neel | 127/68 X |
| 4,144,087 | 3/1979 | Chwalek et al. | 127/24 |
| 4,207,118 | 6/1980 | Bonnyay et al. | 127/25 X |

FOREIGN PATENT DOCUMENTS 2812920  3/1979  Fed. Rep. of Germany ........ 127/68

Primary Examiner—Kenneth M. Schor

Attorney, Agent, or Firm—Sprung, Horn, Kramer & Woods

[57] ABSTRACT

The method for the production of starch from grain or ground grain products by the wet process comprises a brief steeping of the raw material during which the morphological structures are not broken down by chemical or microbiological processes, and of a comminution of the steeped raw material in a high-pressure apparatus equipped with a splitter head. In this high-pressure apparatus, the steeped raw material is subjected to a pressure of at least 10 bar, fragmented under the action of high shear forces, and exposed to the atmosphere, thus causing the necessary structural breakdown between the starch grains and the protein. For shelled corn after the addition of process water, the shelled corn is fed to a heated pressure steeping apparatus. After a maximum of three hours at a pressure of 10 to 15 bar, the necessary moisture absorption is achieved. Excess water is fed to an evaporator. A pressure reducing apparatus at the output of the steeping apparatus produces a preliminary fragmentation of the corn grains. The germs can be separated from the corn mash by means of a degerminator. In a high-pressure apparatus, equipped with a splitter head, the breakdown of the morphological structure between the starch grains and the protein matrix is performed at a pressure of approximately 100 bar, together with a fine fragmentation of the raw material.

6 Claims, 3 Drawing Figures

METHOD OF PRODUCING STARCH FROM GRAIN OR GROUND GRAIN PRODUCTS BY THE WET PROCESS

BACKGROUND OF THE INVENTION

The invention relates to a method of obtaining starch from grain or ground grain products by a wet process, wherein process water is added to the grain and the grain is first subjected to a steeping, the steeping is followed in some cases by a preliminary fragmentation for the purpose of then degerminating the product, the product is then subjected to an extensive fragmentation followed by the separation of fiber by means of sieves, and the separation of starch and suspended protein is performed by centrifugation.

Such methods of producing starch from grains are known, especially the production of starch from corn. The steeping of the corn is performed discontinuously in a counterflow apparatus with the addition of sulfur dioxide to the steep water, and after about 35 to 50 hours of steeping at a temperature of 45° to 60° C., an optimum disruption of the morphological structure between the elements of the grain as well as the starch grains and the protein is achieved, which is necessary in order to separate the starch grains from suspended protein and to refine the starch.

The fatty germ can be separated from the steeped corn after preliminary fragmentation by wet grinding, on the basis of the difference in density, before another fragmentation of the degermed product is performed, for example in a high-speed attrition mill, followed by the separation of hulls and fibers by sieves and the separation of starch grains and suspended protein by centrifugal separators.

The above-mentioned very complex and to some extent only empirically explainable steeping process has proven to be an indispensable step in the production of starch.

It is precisely in the steeping process that the difficulty is encountered in starch production. Furthermore, on account of the long steeping time that is required, very large batches of raw material are always involved in the process.

Disadvantages which the steeping process entails, such as the great investment and maintenance costs of the steeping apparatus, large floor space requirements, poor flexibility in the event of sudden changes in production requirements, as well as high consumption of energy and adjuvants have had to be accepted heretofore.

Furthermore, substances which go into solution, due to no small extent to microbial reactions which occur during the long steeping process, place an additional burden on the refinement of starch due to the addition of fresh water. Losses occur, for example, of dissolved proteins and carbohydrates which, after thickening in evaporators, are added to the hulls and fibers before drying. Also, substances contained in the grain are lost in the form of gaseous and steam-volatile metabolites due to microbial degradation.

The necessity of concentrating all of the steep water in order to recover dissolved and colloid substances also entails the great expense of evaporation and drying.

The condensate from the steep water evaporation cannot be recirculated on account of its high content of steam-volatile substances, and it constitutes a biological pollution problem in the sewerage.

The use of sulfur dioxide as an aid in the stabilization and control of fermentation during the lengthy steeping process has created the need for special precautions to safeguard personnel and equipment.

Heretofore it has been impossible to perform the costly steeping process continuously and shorten it while nevertheless permitting the desired separation of grain components.

In the article, "Biochemisch-technologische Studien über die Nassverarbeitung von Mais" in the publication *Starke* 21 (1972), pp. 68–73, reference is made to Russian attempte to grind the grain coarsely, and then steep it in horizontal diffusers under ultraviolet irradiation or with the application of ultrasound in one instance, and to hull or coarsely grind the grain, for the purpose of shortening the steeping time; however, studies have shown that the starch yield is diminished by this method and the quality of the starch is poorer.

A method for the continuous steeping of starch has been disclosed in DE-AS No. 12 88 530, wherein a continuous steeping of corn combined with chemical treatment with sulfuric acid has been proposed. In the Additional Application DE-AS No 13 01 976, the method is improved by washing the steeped corn until the wash water has a neutral reaction. Then the corn is additionally steeped in hot water containing $NaHCO_3$. The steeping time in this procedure is said to be reduced to 6 hours, and the steeping is said to be performed in a horizontally disposed pipe system.

Nothing is known about the biochemical and microbial processes involved in this steeping method. However, the increase of the dry matter content in the steep water to 8 percent indicates an appreciable leaching out of the corn grains.

The process was repeated on a laboratory scale, and it was found that it failed to achieve the quantities and qualities obtainable by the conventional sulfur dioxide counterflow process. It is probably for this reason that the process has not yet been adopted in practice.

All of the methods disclosed for reducing the cost of obtaining starch from grains or ground products of grain concentrate on the steeping process, which in any case results in a considerable exchange of substances. In addition to the absorption of water, it is always chemical or microbial reactions which form the basis for the cleavage of the starch-to-protein bond. In the known methods, mechanical action subsequent to the steeping is unimportant and serves only for the fragmentation of the grain structures.

SUMMARY OF THE INVENTION

It is the object of the invention to make the method of obtaining starch from grains simpler and more economical without any loss of starch quality or of yield of dry substance.

This object is achieved in accordance with the invention by subjecting the raw material to a brief steeping wherein the morphological structures of the grain are disrupted neither chemically nor microbiologically, by then introducing the steeped raw material into a high-pressure apparatus equipped with a splitter head, under a pressure of at least 10 bar, fragmenting it under the action of high shear forces, and relieving it into the atmosphere, thereby achieving the necessary structural disruption between the starch grains and the protein.

Since in the method of the invention the steeping of the raw material is performed for only a short length of time and the structural disruption between the starch grains and the protein is accomplished by the action of high mechanical forces produced in the high-pressure apparatus with the splitter head, the length of time involved in the method is considerably reduced.

The time-consuming disruption of the morphological structure of the grain by biochemical and microbial reactions with the addition of specific adjuvants such as sulfur dioxide is unnecessary in this short steep, since the requirement that the products be germ-free is satisfied during manufacture by the killing of all vegetable organisms as a result of the high-pressure treatment.

Essential to the achievement of optimum results in the mechanical disruption of morphological structure of grain is the selection of the nozzle geometry in the splitter head, the operating pressure and the concentration of the raw material.

The protein is completely suspended, as are other high-polymer substances which exercise a structure-stabilizing or protective function and are insoluble in their native state. Colloid components which cannot be separated by centrifugation are present only in traces. Salts and low-molecular substances such as are present in the native grain are dissolved. Degradation products of high-molecular-weight grain components form in only small amounts, thus reducing the solutes in the process water which is repeatedly recirculated in the subsequent process steps, in comparison to the solute content of the process water in the conventional process.

The very intense fragmentation of the grits occurring when they are treated in the high-pressure apparatus is a desirable secondary effect which assures a good separation of fibers and starch, especially in the glassy endosperm. It cannot be compared with the fragmentation obtained with conventional mills in the conventional starch manufacturing process.

Additional features and characteristics of the method of the invention and its improvement and modification will be found hereinafter and with reference to the accompanying drawings wherein:

DETAILED DESCRIPTION OF THE INVENTION

Figure 1:
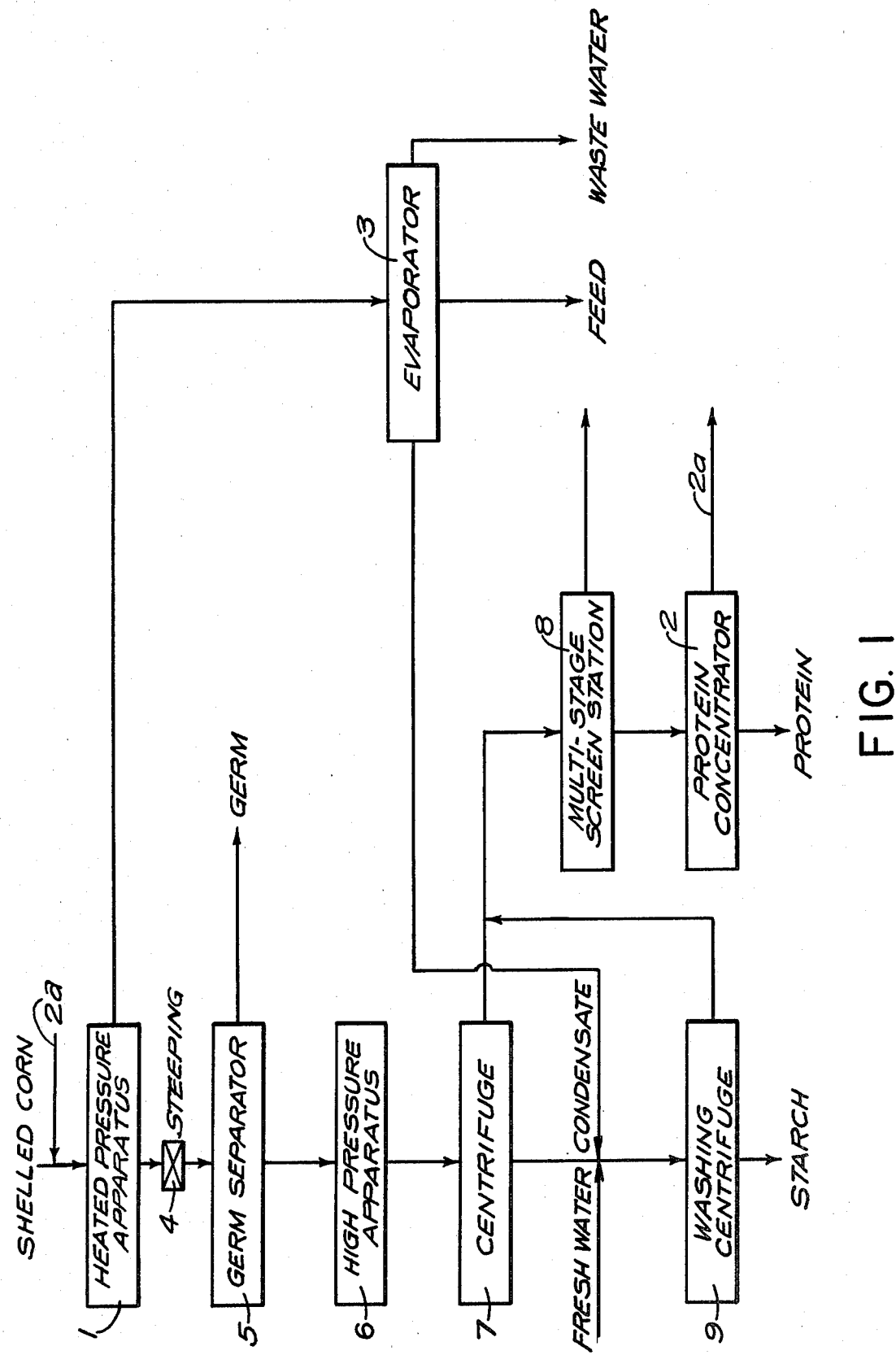
FIG. 1 is a diagrammatic representation of a method for the production of starch and by-products from corn (maize) according to the invention.

In the diagram in FIG. 1, 1 identifies a heated pressure steeping apparatus to which cleaned, shelled corn is fed continuously after the metered addition through line 2a of 1.2 times the volume of process water which is obtained, for example, from the protein concentrator 2, the temperature in the steeping apparatus being established by indirect heating at 50° to 60° C. The necessary amount of moisture absorption is achieved after a maximum of three hours at a pressure of 10 to 15 bar, preferably 15 bar. Fifty percent of the free steep water is separated and fed to an evaporator 3. A pressure reducing apparatus 4, which can also be in the form of a splitter head, is provided at the outlet of the steeping apparatus and causes a preliminary fragmentation of the corn. The germs can be separated from the grits by means of a germ separator 5. In a high-pressure apparatus 6 equipped with a splitter head, for example a Model HDP 220 made by Paul Hammelmann GmbH & Co., KG, of Oelde, at a pressure of about 100 bar, the morphological structure between the starch grains and the protein matrix is broken up with a simultaneous fine fragmentation of the raw material, this being accomplished exclusively by the action of mechanical shearing and cleaving forces on the steeped raw material.

A centrifuge 7 separates the fraction of suspended protein produced from the high-pressure apparatus 6, as well as hulls and fibers, from the raw starch milk. The hulls and fibers are filtered out of the protein suspension in a multi-stage screen station 8. This, together with the steep water concentrate, forms the protein feed. The protein suspension is further thickened in the concentrator 2. The refinement of the raw starch milk is performed with the addition of steep water condensate and fresh water in a washing centrifuge 9.

Instead of the pressure steep, steeping can be performed at atmospheric pressure or slightly greater pressure, a maximum steep of twelve hours being sufficient.

Figure 2:
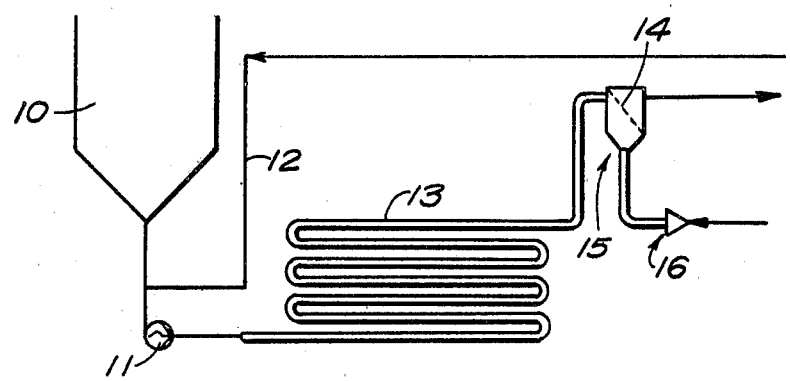
FIG. 2 represents a pressure steeping apparatus for the method of FIG. 1.

An embodiment of a pressure steeping apparatus is represented in FIG. 2. The shelled corn is pumped with a pump 11 from a hopper 10 after process water has been fed into it through a pipeline 12. The pump continuously delivers the shelled corn to a coil of tubing 13 in which the short steep takes place at a pressure of 10 to 15 bar, preferably of 15 bar, and at a temperature of 50° to 60° C. The capacity of the tubing coil amounts to ten to fifteen percent of the daily raw material capacity of the installation. At the output from the coil there is provided a tank 15 equipped with a screen 14. The excess water is drawn off through the screen. A pressure reducer 16 is connected to the output of the tank 15.

Figure 3:
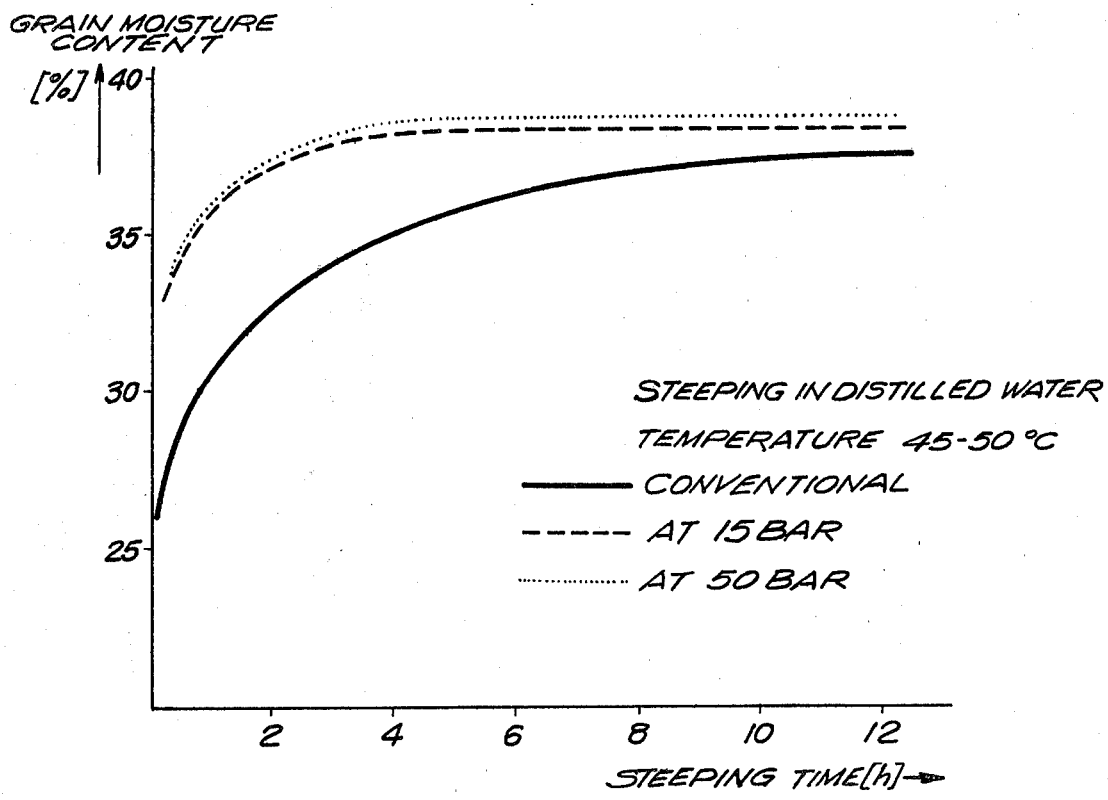
FIG. 3 is a graphic representation of the increase in the corn moisture during the short steeping under pressure.

FIG. 3 represents the increase in moisture in the grain during the steeping under pressure, as compared with conventional processes. In less than two hours, a grain moisture content is achieved which corresponds to the maximum moisture absorption of the grain after twelve hours in the conventional process. Optimum conditions for the operation of the pressure steeping apparatus are a pressure of 10 to 15 bar and a steep time of three hours. Less than 0.5 percent of the dry substance of the grain passes over into the steep water.

The following results have been obtained in the production of starch from shelled corn by the method of the invention:

|  | New Method | Conventional Method |
| --- | --- | --- |
| Steeping Process |  |  |
| Steep time | 2–3 h | 30–50 h |
| Required capacity of steeping apparatus | 5 to 6 m³ per ton of corn | 50 to 85 m³ per ton of corn |
| Dry substance of corn in steep water | 0.3 to 0.5% | 5 to 6% |
| Evaporation |  |  |
| Evaporator capacity | 0.2–0.3 m³ per ton of corn | 0.8–1.3 m³ per ton of corn |
| Condensate loading (determined as COD [chemical oxygen | 300–500 mg of oxygen gas per liter | 1000–2000 mg of oxygen gas per liter |

-continued

| | New Method | Conventional Method |
|---|---|---|
| demand]) | | |

The evaporator capacity and operating costs required for the recovery of the starch and of the grain constituents dissolved in the process water amount to less than 25% of the cost involved in the conventional method. A very small content of steam-volatile components makes it possible to recirculate the condensate.

| Starch Separation and Refinement | | |
|---|---|---|
| | New Method | Conventional Method |
| Type of centrifugation | | comparable |
| Starch yield | 70-72% dry substance | 69-71% dry substance |
| Quality of the product | | comparable |

Absolutely speaking, the starch yield can be increased by more than 1%.

The cost of the apparatus for the refinement of the starch can be substantially reduced on account of the substantially lower content of dissolved substances in the starch milk. The fresh water consumption can be reduced by approximately 50%.

| | New Method | Conventional Method |
|---|---|---|
| Water consumption | 0.4-0.8 m³ per ton of corn | 1.2-1.8 m³ per ton of corn |
| Waste water | 0.1-0.5 m³ per ton of corn | 0.8-1.3 m³ per ton of corn |
| Energy consumption | | Owing to the considerably lower consumption of energy in the steeping process and in the steep water processing, an appreciable saving is obtained, especially of thermal energy. |

What is claimed is:

1. In a wet process for obtaining starch from raw grain matrial, wherein the raw material with process water added is steeped, fragmented, screened to remove fiber, and centrifuged to separate starch and suspended protein, the improvement wherein: the step of steeping comprises briefly steeping the raw material without degrading the morphological grain structures chemically and microbiologically by carrying out the steeping in water at a temperature of about 45° to 60° C. with the steeping time being exclusively for the absorption of water and sufficient to achieve a grain moisture content of greater than about 35% but no more than 12 hours under atmospheric pressure and no more than about 3 hours under a pressure of at least 5 bar and wherein the step of fragmenting comprises passing the steeped raw material through a splitter head at a fragmenting pressure of at least 10 bar to fragment same under the action of shear forces and releasing the fragmenting pressure to the atmosphere; whereby the necessary structural disruption between the starch grains and the protein takes place.

2. The process of claim 1, wherein the brief steeping carried out at a pressure of at least 5 bar is continuous.

3. The process of claim 1, for the production of starch from corn, wherein the brief steeping is carried out at a pressure of 10 to 50 bar at a temperature of 50° to 60° C. and with a steeping time of three hours.

4. The process of claim 3, wherein the brief steeping is carried out at a pressure of 15 bar.

5. The process according to claim 1, preliminarily fragmenting the briefly steeped raw material by passing same through a pressure reducing apparatus prior to passing same through the splitter head.

6. The process of claim 5, wherein the step of steeping comprises pumping the raw material through a coil of tubing with process water, withdrawing excess water at the outlet of the tubing in a tank with a sieve and providing the pressure reducing apparatus downstream of the tank.

* * * * *